US010189324B2

(12) United States Patent
Opitz

(10) Patent No.: US 10,189,324 B2
(45) Date of Patent: Jan. 29, 2019

(54) METHOD AND DEVICE FOR COUPLING A MOTOR VEHICLE TO A TRAILER

(71) Applicant: Continental Teves AG & Co. oHG, Frankfurt (DE)

(72) Inventor: Christian Opitz, Garbsen (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 0 days.

(21) Appl. No.: 15/872,583

(22) Filed: Jan. 16, 2018

(65) Prior Publication Data

US 2018/0141397 A1    May 24, 2018

Related U.S. Application Data

(63) Continuation of application No. PCT/EP2016/066523, filed on Jul. 12, 2016.

(30) Foreign Application Priority Data

Jul. 16, 2015  (DE) ........................ 10 2015 213 404

(51) Int. Cl.
| | |
|---|---|
| *B60D 1/36* | (2006.01) |
| *B60Q 9/00* | (2006.01) |
| *G05D 1/02* | (2006.01) |
| *B60D 1/62* | (2006.01) |
| *B60G 17/052* | (2006.01) |
| *B60C 9/00* | (2006.01) |

(52) U.S. Cl.
CPC ................ *B60D 1/36* (2013.01); *B60C 9/00* (2013.01); *B60D 1/62* (2013.01); *B60G 17/052* (2013.01); *G05D 1/021* (2013.01); *B60G 2202/152* (2013.01)

(58) Field of Classification Search
CPC ........... B60D 1/36; B60Q 9/00; B60G 17/052
USPC ............................................................ 701/37
See application file for complete search history.

(56) References Cited

U.S. PATENT DOCUMENTS

| | | | | |
|---|---|---|---|---|
| 2009/0236825 | A1* | 9/2009 | Okuda et al. ............ | B60D 1/36 280/477 |
| 2010/0013188 | A1* | 1/2010 | Ortmann et al. ........ | B60D 1/36 280/477 |

FOREIGN PATENT DOCUMENTS

| | | |
|---|---|---|
| DE | 10302545 | 7/2004 |
| DE | 102004008928 | 9/2005 |
| DE | 102004043761 | 3/2006 |
| DE | 102012005707 | 10/2012 |
| DE | 102013015738 | 10/2012 |

(Continued)

OTHER PUBLICATIONS

International Search Report and Written Opinion dated Oct. 5, 2016 from corresponding International Patent Application No. PCT/EP2016/066523.

(Continued)

*Primary Examiner* — Yazan A Soofi

(57) ABSTRACT

A method for coupling a motor vehicle having a trailer coupling to a coupling element of a trailer with at least partially automatic actuation of the motor vehicle based on data acquired by a surroundings sensor system, for example a surroundings sensor system of the motor vehicle is disclosed. A controlled change in level is carried out at an at least one axle by an air suspension system of the motor vehicle based on the acquired data. A control unit for carrying out the method is also disclosed.

16 Claims, 2 Drawing Sheets

(56) References Cited

FOREIGN PATENT DOCUMENTS

GB    2513393    10/2014

OTHER PUBLICATIONS

German Search Report dated Feb. 23, 2016 for corresponding German Patent Application No. 10 2015 213 404.0.

* cited by examiner

METHOD AND DEVICE FOR COUPLING A MOTOR VEHICLE TO A TRAILER

CROSS-REFERENCE TO RELATED APPLICATIONS

This application claims the benefit of PCT Application PCT/EP2016/066523, filed Jul. 12, 2016, which claims priority to German Application DE 10 2015 213 404.0, filed Jul. 16, 2015. The disclosures of the above applications are incorporated herein by reference.

TECHNICAL FIELD

The disclosure relates to a method and a device for coupling a trailer to a motor vehicle.

BACKGROUND

Motor vehicles are currently increasingly equipped with a surroundings sensor system that is able to detect objects in the surroundings of the vehicle. The data of such surroundings sensors can be used to plan and carry out automatic maneuvers of the vehicle. Such methods are known, for example, from parking assistants.

Similar to automatic parking systems, assistance systems for coupling a trailer to a vehicle are also known.

In particular, in the dark or in bad weather, when the driver is alone, it may be difficult and uncomfortable for the driver to maneuver the vehicle properly for coupling the vehicle to the trailer hitch. It is often necessary to get in and out of the vehicle repeatedly, since a precisely targeted maneuver requires a certain amount of skill on the part of the driver. In addition, the trailer may be very difficult to handle, depending on the design and the load state. An assistance function which forms part of the maneuver or even the entire maneuver in a partially or fully automatic fashion reduces the probability of collisions and constitutes a large gain in comfort for the driver.

A method for automatically coupling or docking by means of an image sensor system includes the coupling of a trailer which is detected by an object detection algorithm. Subsequently, an autonomous coupling maneuver can be carried out, where the necessary lock angle of the steering wheel and the speed for approaching the coupling of the trailer are calculated.

A method is known in which a camera on-board the motor vehicle captures a towing head of a trailer as a maneuvering target and maneuvers the vehicle partially or fully automatically into a position that is suitable for coupling. The driver may be informed as to whether the towing head of the trailer drawbar is lower than the ball head of the trailer device, with the result that the driver can raise the trailer drawbar. A disadvantage is that vertical adjustments of the trailer drawbar have to be made by the driver. The driver must therefore, under certain circumstances, repeatedly get in and out of the vehicle, which is uncomfortable and possibly time-consuming. In addition, the vertical adjustment of the trailer drawbar can likewise be difficult, time-consuming or uncomfortable, depending on the design of the trailer and the load state.

SUMMARY

The disclosure provides an improvement, or a more comfortable and/or more economical in terms of time method for partially or fully automatically coupling trailers.

One aspect of the disclosure provides a partially or entirely automated coupling process in that level changes which are suitable for this purpose are carried out by means of an air suspension system contained in the vehicle. Data relating to the surroundings of the vehicle, which data is acquired by a surroundings sensor system, is evaluated in order to determine the suitable actuation. The evaluation of the surroundings sensor system data, combined with the actuation of the air suspension system, makes it possible to carry out the coupling process in a largely automated and as a result comfortable fashion.

Implementations of the disclosure may include one or more of the following optional features. In some implementations, a change in level takes place at the rear axle. In some examples, a change in level additionally takes place at the front axle. In some implementations, a change in level of the entire vehicle and/or a pitching movement of the vehicle, takes place. A pitching movement is caused by the fact that a controlled change in level takes place at one axle in one direction, while the level at the other axle remains unchanged or else is changed in the opposite direction. Such a movement may be advantageous, since in this way the largest possible change in level of the trailer coupling of the motor vehicle is obtained with small changes to the levels of the axles, the trailer coupling usually located at the rear end of the vehicle.

In some implementations, automated maneuvering of the motor vehicle into an initial position in the vicinity of the trailer occurs because of the evaluation of the data of the surroundings sensor system. The levels of the coupling element of the trailer and of the trailer coupling of the motor vehicle are checked when the motor vehicle is in this initial position. This has the advantage that the levels can be checked more accurately.

The initial position may be determined in such way that the trailer coupling of the vehicle is in the direct vicinity of the coupling element of the trailer, with the result that the trailer coupling of the vehicle and the coupling element of the trailer are less far apart from one another than a predefined distance.

In some examples, the levels of the trailer coupling of the vehicle and of the coupling element of the trailer are checked both directly after triggering the method and after the initial position is reached.

The data obtained by the surroundings sensor system may be used to check whether, in comparison with the coupling element of the trailer, the trailer coupling of the motor vehicle is at a level that is suitable for coupling.

A level of the trailer coupling of the motor vehicle which is suitable for coupling is understood here to be the level at which the trailer coupling fits under the coupling element of the trailer, with the result that the trailer coupling can be moved vertically under the coupling element of the trailer by maneuvering the vehicle and/or trailer. The level of the coupling element of the trailer may be acquired by the surroundings sensor system.

In some implementations, the suitable level of the trailer coupling of the motor vehicle is determined in such a way that the highest point of the trailer coupling of the motor vehicle is lower, at least by a defined value, than the lowest point of the coupling element of the trailer.

In some examples, a controlled change in level takes place at at least one axle if, in comparison with the coupling element of the trailer, the trailer coupling of the motor vehicle is not at a level which is suitable for coupling.

Furthermore, automated maneuvering may take place into a position in which the coupling element of the trailer is located above (e.g., substantially vertically above) the trailer coupling of the motor vehicle if the check has revealed that, in comparison with the coupling element of the trailer, the trailer coupling of the motor vehicle is at a level which is suitable for coupling. Automated maneuvering has allows for the assistance system to position the motor vehicle very precisely based on the acquired surroundings data, with the result that the trailer coupling of the motor vehicle can come to be located very precisely under the coupling element of the trailer. In addition, when the maneuver is carried out manually by the driver as result of the often restricted view of the trailer coupling and coupling element and the necessary proximity of the motor vehicle to the trailer, there is an increased risk of a collision, which is reduced by carrying out the maneuver automatically.

After the position in which the coupling element of the trailer is located above the trailer coupling of the motor vehicle is reached, a controlled change in level takes place at at least one axle in such way that the trailer coupling of the motor vehicle engages into the coupling element of the trailer.

In some examples, the method is triggered by an input by the driver at an interface. The interface may be a pushbutton key. After the triggering by the driver, the method may be carried out independently of the driver. As an alternative to this, in some examples, the driver may trigger individual method steps by an input.

In some implementations, a fault message is issued to the driver when the check as to whether the trailer coupling of the motor vehicle is located, in comparison with the coupling element of the trailer, at a level H which is suitable for coupling, has revealed that, in comparison with the coupling element of the trailer, the trailer coupling of the motor vehicle is not located at a level which is suitable for coupling and a controlled change in level at at least one axle such that the trailer coupling is moved to a suitable level H cannot take place. This may be the case, for example, if the technical configuration of the air suspension does not permit a suitable level to be set at the axle or axles or if the setting of the level would violate a predefined safety limiting value.

In some implementations, safety limiting values are predefined for the vertical adjustment at the axles. This serves to prevent the vehicle from scraping along the ground, for example, along uneven parts of the ground, or serves to prevent a collision with uneven parts or low obstacles which can normally be traveled over (for example curb stone edges). Different safety limiting values are provided as a function of whether the vehicle is in a stationary state or is moving and/or what distance is to be travelled in the case of automatic maneuvering. Safety limiting values can additionally or alternatively be defined as a function of the information about the condition of the ground which is made available by means of the surroundings sensor system (for example divided into categories: even ground, uneven ground, obstacles present).

Furthermore, a fault message may be issued to the driver if automated maneuvering into the next position provided by the method cannot take place. This may be the case, for example, if no suitable trajectory can be calculated for the automatic maneuvering, because e.g., there is not sufficient space available or obstacles have been detected between the motor vehicle and the trailer by the surroundings sensor system.

The method may be carried out by a controller which is specially provided for this purpose or by a controller which is already present, depending on the design. In this context, controllers which are additionally present in the vehicle can also be actuated for individual method steps.

In vehicles that contain a parking assistant, a position pre-definition may be transferred to the parking assistant, which maneuvers the vehicle into the predefined position.

The disclosure also relates to a control unit in which a method according to the disclosure is carried out.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
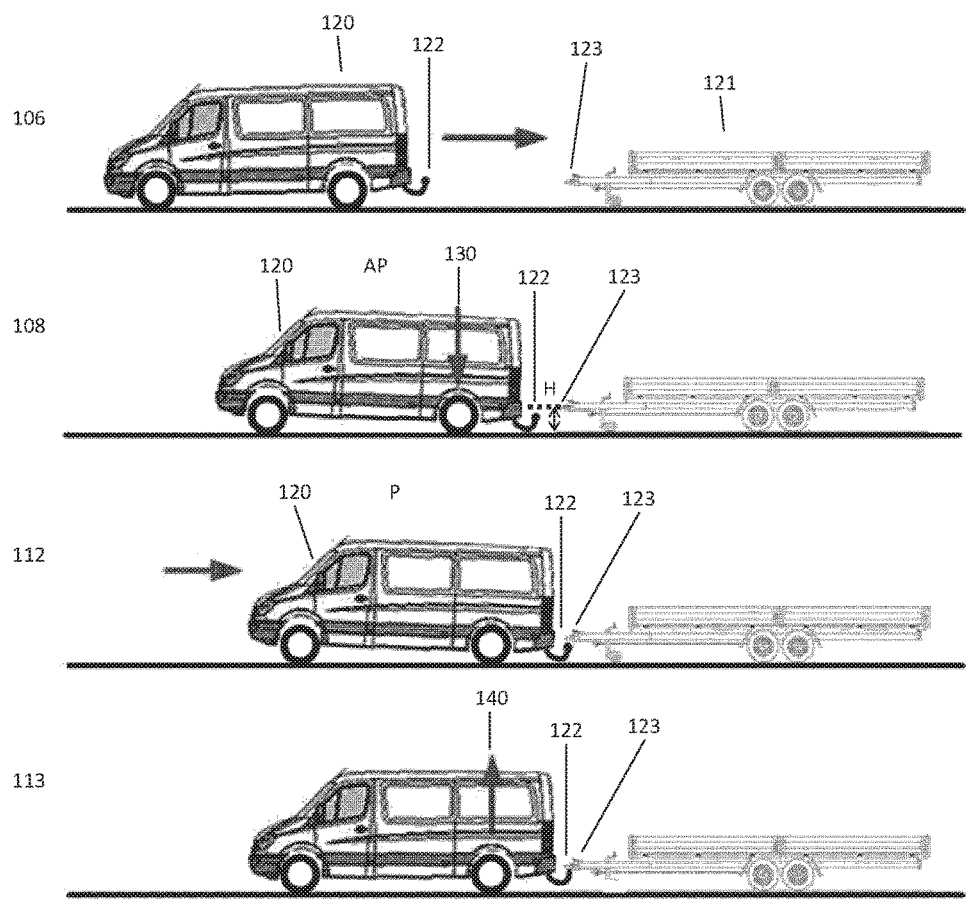
FIG. 1 shows a schematic illustration of individual exemplary method steps.

FIG. 1 illustrates individual sections of an exemplary method with reference to schematic drawings of a vehicle and of a trailer. A motor vehicle 120 is shown together with a trailer coupling 122 and a trailer 121 with a coupling element 123. Arrows indicate movements of the motor vehicle.

In method step 106, the motor vehicle 120 is maneuvered in an automated fashion into an initial position AP in the vicinity of the trailer 121.

In method step 108, the vehicle 120 is in the initial position AP. The rear axle is lowered by the air suspension system (indicated by the arrow 130), with the result that the trailer coupling 122 is located at a level H above the ground. In this context, the level H is determined such that the highest point of the trailer coupling 122 is below the lowest point of the coupling element 123.

In method step 112, the vehicle 120 is automatically maneuvered into a coupling position P, with the result that the trailer coupling 122 is located essentially vertically under the coupling element 123.

In method step 113, the rear axle is raised again by the air suspension system (indicated by the arrow 140), with the result that the trailer coupling 122 engages in the coupling element 123.

Figure 2:
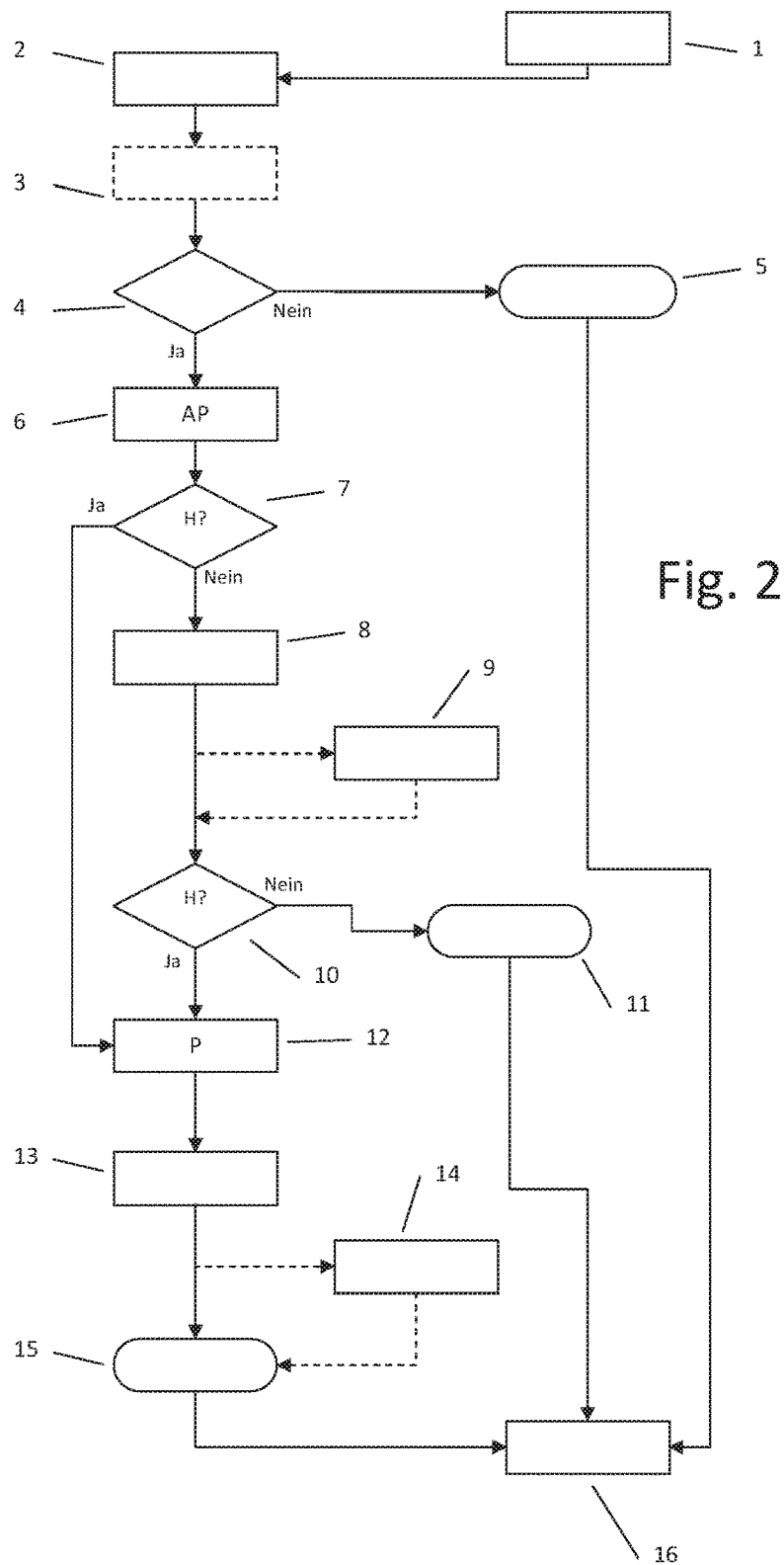
FIG. 2 shows a schematic flow chart of an exemplary method.

A method sequence of the disclosure is shown in FIG. 2. The method for coupling a motor vehicle to a trailer starts, for example, in block 1 by an input from the driver at an interface, e.g. by activating a pushbutton key.

Subsequently, a control unit automatically carries out the method. In this case, various control systems and actuators of the vehicle can be actuated. In this context, for example driver-independent interventions can be made into at least one of the following systems: Steering system, braking (individually or as the entire braking system), drive, air suspension system.

In block 2, the surroundings are monitored by a surroundings sensor system arranged in the vehicle. Based on the data it is detected whether a trailer is located in the vicinity and where the trailer and the associated coupling element are located. In order to avoid incorrect actuations, the detected position of the coupling element of the trailer is confirmed by the driver. For example, this can be done by the detected trailer and the detected coupling element being displayed and marked visually. The driver then confirms by inputting an input that the desired target for the coupling process has been correctly detected.

In motor vehicles with a folding-out trailer coupling, in the optional Block 3 automatic folding out of the trailer coupling of the motor vehicle may be carried out.

In block 4, a suitable trajectory for the motor vehicle is subsequently calculated, in order to maneuver the motor vehicle in an automated fashion into an initial position AP in the vicinity of the trailer. In block 4 it is also checked whether there is sufficient space available for the maneuvering operation. If this is not the case (no in block 4), a fault message is issued to the driver in block 5.

If the result of the check in block 4 is positive (yes), the vehicle maneuvers automatically into the initial position (AP) in block 6.

Subsequently, in block 7, data of the surroundings sensor system are evaluated in order to determine whether the trailer coupling of the motor vehicle is located, in comparison with the coupling element of the trailer, at a level H that is suitable for coupling.

If the result is positive (yes in block 7), the vehicle is maneuvered directly into a coupling position P (block 12). This is the position in which the trailer coupling of the motor vehicle is located essentially vertically under the coupling element of the trailer.

If the check in block 7 reveals that the trailer coupling of the motor vehicle is not located, in comparison with the coupling element of the trailer, at a level H which is suitable for coupling (no in block 7), the rear axle of the motor vehicle is lowered in block 8 by the air suspension system. Optionally, in block 9, the front axle of the motor vehicle is additionally raised by the air suspension system, in order to lower the trailer coupling of the motor vehicle further.

Subsequently, in block 10, it is checked again whether the trailer coupling of the motor vehicle is located, in comparison with the coupling element of the trailer, at a level H which is suitable for coupling. If this is still not the case (no in block 10), a fault message (block 11) is issued to the driver and the method is ended (block 16).

The driver then has, for example, the possibility of manually changing the level of the coupling element of the trailer coupling and of re-starting or continuing the method by inputting (e.g., an input).

If the checking of the levels of the trailer coupling of the motor vehicle and of the coupling element of the trailer in block 10 reveals that they are located at levels which are suitable for coupling (yes in block 10), the vehicle is maneuvered into the coupling position P in block 12.

After the coupling position P, at which the trailer coupling of the motor vehicle is located under the coupling element of the trailer, is reached, in block 13 the rear axle is raised again by the air suspension system. Optionally, the front axle is lowered again in block 14. By raising the rear axle and, if appropriate, lowering the front axle, the trailer coupling of the motor vehicle engages into the coupling element of the trailer, and the trailer is coupled.

In block 15, it is signaled to the driver that the coupling process has been successfully carried out. The method is ended in block 16.

The driver may subsequently perform the further customary steps for concluding the coupling process, such as for example forming the electrical connection and releasing the handbrake of the trailer. In one preferred embodiment of the invention, these steps are also carried out partially or entirely automatically, depending on the equipment of the trailer.

A number of implementations have been described. Nevertheless, it will be understood that various modifications may be made without departing from the spirit and scope of the disclosure. Accordingly, other implementations are within the scope of the following claims.

What is claimed is:

1. A method for coupling a motor vehicle having a trailer coupling to a coupling element of a trailer with at least partially automatic actuation of the motor vehicle, the motor vehicle includes a surroundings sensor system, at least one axle, and an air suspension system, the method comprising:
   acquiring, from the surroundings sensor system, data;
   checking, using the data obtained by the surroundings sensor system, when the trailer coupling of the motor vehicle is at a level which is suitable for coupling, in comparison with the coupling element of the trailer; and
   controllably adjusting a level of the at least one axle of the motor vehicle by way of the air suspension system based on the acquired data;
   wherein when, in comparison with the coupling element of the trailer, the trailer coupling of the motor vehicle is at a level which is suitable for coupling, automated maneuvering takes place into a position in which the coupling element of the trailer is located above the trailer coupling of the motor vehicle; and
   wherein after the position in which the coupling element of the trailer is located above the trailer coupling of the motor vehicle is reached, a controlled change in level takes place at the at least one axle in such a way that the trailer coupling of the motor vehicle engages into the coupling element of the trailer.

2. The method of claim 1, wherein the at least one axle includes a rear axle.

3. The method of claim 2, wherein the at least one axle includes a front axle and adjusting a level of the at least one axle includes adjusting a level at the rear axle and adjusting a level at the front axle.

4. The method of claim 1, wherein when, in comparison with the coupling element of the trailer, the trailer coupling of the motor vehicle is not at a level which is suitable for coupling, controllably adjusting the level of the at least one axle.

5. The method of claim 1, further comprising: issuing a fault message to a driver of the vehicle if the check has revealed that, in comparison with the coupling element of the trailer, the trailer coupling of the motor vehicle is not located at a level which is suitable for coupling and a controlled change in level at the at least one axle such that the trailer coupling is moved to a suitable level cannot take place.

6. The method of claim 1, further comprising:
   evaluating the data of the surroundings sensor system, and based on the evaluated data:
      automated maneuvering of the motor vehicle into an initial position in the vicinity of the trailer takes place; and
      checking the levels of the coupling element of the trailer and of the trailer coupling of the motor vehicle to determine if the motor vehicle is in the initial position.

7. The method of claim 6, further comprising issuing a fault message to a driver of the vehicle if automated maneuvering into the initial position cannot take place.

8. The method of claim 1, further comprising: inputting an input by a driver of the vehicle before acquiring data, wherein after inputting the input by the driver, the method is carried out independently of the driver or partially independently of the driver.

9. A control unit for a motor vehicle designed to actuate at least one air suspension system of the motor vehicle, the control unit receives data of a surroundings sensor system, the control unit executes a method for coupling the motor vehicle having a trailer coupling to a coupling element of a trailer with at least partially automatic actuation of the motor vehicle, the method comprising:

acquiring, from the surroundings sensor system, data;

checking, using the data obtained by the surroundings sensor system, when the trailer coupling of the motor vehicle is at a level which is suitable for coupling, in comparison with the coupling element of the trailer; and controllably adjusting a level of at least one axle of the motor vehicle by way of the air suspension system based on the acquired data;

wherein when, in comparison with the coupling element of the trailer, the trailer coupling of the motor vehicle is at a level which is suitable for coupling, automated maneuvering takes place into a position in which the coupling element of the trailer is located above the trailer coupling of the motor vehicle; and wherein after the position in which the coupling element of the trailer is located above the trailer coupling of the motor vehicle is reached, a controlled change in level takes place at the at least one axle in such a way that the trailer coupling of the motor vehicle engages into the coupling element of the trailer.

10. The control unit of claim 9, wherein the at least one axle includes a rear axle.

11. The control unit of claim 10, wherein the at least one axle includes a front axle and adjusting a level of the at least one axle includes adjusting a level at the rear axle and adjusting a level at the front axle.

12. The control unit of claim 9, wherein the method further comprises when, in comparison with the coupling element of the trailer, the trailer coupling of the motor vehicle is not at a level which is suitable for coupling, controllably adjusting the level of the at least one axle.

13. The control unit of claim 9, the method further comprises issuing a fault message to a driver of the vehicle if the check has revealed that, in comparison with the coupling element of the trailer, the trailer coupling of the motor vehicle is not located at a level which is suitable for coupling and a controlled change in level at the at least one axle such that the trailer coupling is moved to a suitable level cannot take place.

14. The control unit of claim 9, further comprising:

evaluating the data of the surroundings sensor system, and based on the evaluated data:

automated maneuvering of the motor vehicle into an initial position in the vicinity of the trailer takes place, and checking the levels of the coupling element of the trailer and of the trailer coupling of the motor vehicle to determine if the motor vehicle is in the initial position.

15. The method of claim 2, wherein adjusting a level of the at least one axle includes raising a level at the rear axle.

16. The method of claim 3, wherein adjusting a level at the front axle includes lowering a level of the front axle.

* * * * *